United States Patent
Sun

(10) Patent No.: US 9,995,980 B2
(45) Date of Patent: Jun. 12, 2018

(54) LCD PANEL AND LCD DEVICE

(71) Applicant: Shenzhen China Star Optoelectronics Technology Co., Ltd., Shenzhen (CN)

(72) Inventor: Bo Sun, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 352 days.

(21) Appl. No.: 14/766,761

(22) PCT Filed: Apr. 15, 2015

(86) PCT No.: PCT/CN2015/076669
§ 371 (c)(1),
(2) Date: Aug. 10, 2015

(87) PCT Pub. No.: WO2016/161665
PCT Pub. Date: Oct. 13, 2016

(65) Prior Publication Data
US 2016/0299379 A1    Oct. 13, 2016

(30) Foreign Application Priority Data

Apr. 7, 2015 (CN) .......................... 2015 1 0162687

(51) Int. Cl.
G02F 1/136    (2006.01)
G02F 1/1362    (2006.01)
G02F 1/1335    (2006.01)

(52) U.S. Cl.
CPC .. *G02F 1/136286* (2013.01); *G02F 1/133509* (2013.01)

(58) Field of Classification Search
CPC ............ G02F 1/1368; G02F 1/136227; G02F 1/136286; G02F 1/133509
USPC .......................................................... 349/43
See application file for complete search history.

(56) References Cited

U.S. PATENT DOCUMENTS

| | | | |
|---|---|---|---|
| 2005/0253984 A1* | 11/2005 | Kim | G02F 1/1362 349/106 |
| 2014/0346504 A1 | 11/2014 | Misaki | |
| 2015/0185556 A1 | 7/2015 | Arai et al. | |
| 2015/0192814 A1 | 7/2015 | Kosugi et al. | |
| 2016/0131953 A1 | 5/2016 | Xu et al. | |
| 2016/0246111 A1* | 8/2016 | Chen | H04N 9/12 |

FOREIGN PATENT DOCUMENTS

| | | |
|---|---|---|
| CN | 101650502 | 2/2010 |
| CN | 104011587 | 8/2014 |
| CN | 104375313 | 2/2015 |
| JP | 11-084369 | 3/1999 |

(Continued)

*Primary Examiner* — Nathanael R Briggs
*Assistant Examiner* — William Peterson

(57) ABSTRACT

An LCD panel and an LCD device are provided. The LCD panel includes a first substrate, which includes a first metal layer, a first insulating layer, an active layer, a second metal layer, a second insulating layer, a color barrier layer, a first transparent conductive layer, a planarization layer, and a second transparent conductive layer electrically connected with the first transparent conductive layer sequentially formed. The first metal layer includes scanning lines. Black matrices are arranged on positions corresponding to scanning lines and corresponding to channels.

13 Claims, 3 Drawing Sheets

(56) References Cited

FOREIGN PATENT DOCUMENTS

| | | |
|---|---|---|
| JP | 2000-162625 | 6/2000 |
| JP | 2010-072512 | 4/2010 |
| WO | WO 2014/045601 | 3/2014 |
| WO | WO 2014/069484 | 5/2014 |

* cited by examiner

LCD PANEL AND LCD DEVICE

RELATED APPLICATIONS

This application is a National Phase of PCT Patent Application No. PCT/CN2015/076669 having International filing date of Apr. 15, 2015, which claims the benefit of priority of Chinese Patent Application No. 201510162687.3 filed on Apr. 7, 2015. The contents of the above applications are all incorporated by reference as if fully set forth herein in their entirety.

BACKGROUND OF THE INVENTION

Field of the Invention

The present invention relates to liquid crystal display (LCD) technology, and more particularly to an LCD panel and an LCD device.

Description of Prior Art

As shown in FIG. 1, an existing LCD panel includes a first substrate 10 and a second substrate 20, and the second substrate 20 comprises a plurality of black matrices 22 and a second common electrode 23. The black matrices 101 which correspond to a data line are illustrated in FIG. 1, and for example, the first substrate 10 is a COA (Color Filter on Array) substrate, which is a color filter film produced on an array substrate. The first substrate 10 includes a base substrate 11; a first metal layer 12 disposed on the base substrate 11 includes a gate, a scan line, and a first common electrode. A portion of a first insulating layer 13 is disposed on the first metal layer 12 for isolating the first metal layer 12 and the active layer 14. A portion of an active layer 14 is disposed on the first insulating layer 13 for forming a channel. A second metal layer 15 disposed on the active layer 14 includes a source, a drain electrode, and a data line 151. A second insulating layer 16 is disposed on the second metal layer 15 for isolating the second metal layer 15 and a color barrier layer 17. The color barrier layer 17 disposed on the second insulating layer 16 includes a plurality of color resist films (such as a red color film 171, a green color film 172, a blue color film 173), and there is a through-hole 18 formed in the color barrier layer 17. A portion of a first transparent conductive layer 19 disposed on the color barrier layer 17 includes pixel electrodes, and the first transparent conductive layer 19 is connected with the second metal layer 15 by the through-hole 18.

In the fabrication process, an overlapping region between two adjacent color resist films disposed above the data line 151 is present, and a non-uniform electric field is caused by an uneven surface of the color barrier layer. Consequently, liquid crystal molecules on the overlapping region deflect irregularly due to the overlapping region which is relatively large and cannot be completely shielded by the data line alone. To prevent this situation from occurring, a position corresponding to the overlapping region is required to be shielded by using the black matrices, thereby sacrificing a large portion of an aperture ratio. Furthermore, a coupling capacitance between a scan line and a pixel electrode is generated since the voltage fluctuation of a scanning line is relatively large. Thus, the electric field around the overlapping region is influenced and thereby light leakage occurs. Accordingly, it is necessary to arrange a black matrix on the position corresponding to the scanning line. As such, the aperture ratio will be further reduced.

Therefore, there is a need to provide an LCD panel and an LCD device in order to solve the existing problem of the prior art.

SUMMARY OF THE INVENTION

The objective of the present invention is to provide an LCD panel and an LCD device to solve the technical problems in the prior art, in which the black matrices are used to shield the overlapping regions and results in a decreased aperture ratio.

To solve the foregoing problems, the present invention fabricates an LCD panel, which comprises:
  a first substrate; and
  a second substrate, disposed opposite to the first substrate, including a plurality of black matrices;
  wherein the first substrate comprises:
  a base substrate;
  a first metal layer disposed on the base substrate, including a gate, a scan line, and a first common electrode;
  a first insulating layer, of which a portion is disposed on the first metal layer for isolating the first metal layer and an active layer;
  the active layer, of which a portion is disposed on the first insulating layer for forming channel;
  a second metal layer disposed on the active layer, including a source, a drain, and a data line;
  a second insulating layer disposed on the second metal layer, for isolating the second metal layer and a color barrier layer;
  the color barrier layer disposed on the second insulating layer, including a plurality of color resist films, wherein a through-hole is formed in the color barrier layer;
  a first transparent conductive layer, of which a portion is disposed on the color barrier layer, the first transparent conductive layer being connected with the second metal layer by the through-hole;
  a planarization layer disposed on the first transparent conductive layer; and
  a second transparent conductive layer disposed on the planarization layer, and electrically connected to the first transparent conductive layer;
  wherein the second transparent conductive layer includes a first conductive portion and a second conductive portion, the first conductive portion corresponds to a position of the scanning line, and a voltage of the first conductive portion is equal to a preset voltage, the black matrices are arranged only on positions corresponding to the channel, an overlapping region is generated between two adjacent color resist films, and the position of the scanning line corresponds to a position of the overlapping region.

In the LCD panel of the present invention, the LCD panel has a display area, and the first conductive portion is electrically connected to the first common electrode by a through-hole disposed outside of the display area.

In the LCD panel of the present invention, the position of the data line also corresponds to the position of the overlapping region.

To solve the foregoing problems, the present invention fabricates an LCD panel, which comprises:
  a first substrate; and
  a second substrate, disposed opposite to the first substrate, including a plurality of black matrices;

wherein the first substrate comprises:
a base substrate;
a first metal layer disposed on the base substrate, including a gate, a scan line, and a first common electrode;
a first insulating layer, of which a portion is disposed on the first metal layer for isolating the first metal layer and an active layer;
the active layer, of which a portion is disposed on the first insulating layer for forming channel;
a second metal layer disposed on the active layer, including a source, a drain, and a data line;
a second insulating layer disposed on the second metal layer, for isolating the second metal layer and a color barrier layer;
the color barrier layer disposed on the second insulating layer, including a plurality of color resist films, wherein a through-hole is formed in the color barrier layer;
a first transparent conductive layer, of which a portion is disposed on the color barrier layer, the first transparent conductive layer being connected with the second metal layer by the through-hole;
a planarization layer disposed on the first transparent conductive layer; and
a second transparent conductive layer disposed on the planarization layer, and electrically connected to the first transparent conductive layer;
wherein black matrices are arranged on the positions corresponding to the scanning line and the channel.

In the LCD panel of the present invention, the second transparent conductive layer includes a first conductive portion and a second conductive portion, the first conductive portion corresponds to a position of the scanning line, and a voltage of the first conductive portion is equal to a preset voltage.

In the LCD panel of the present invention, the black matrices are arranged only on the positions corresponding to the channel.

In the LCD panel of the present invention, the LCD panel has a display area, and the first conductive portion is electrically connected to the first common electrode by passing through a through-hole disposed outside of the display area.

In the LCD panel of the present invention, an overlapping region is generated between two adjacent color resist films, and the position of the scanning line corresponds to the position of the overlapping region.

In the LCD panel of the present invention, an overlapping region is generated between two adjacent color resist films, and the position of the data line also corresponds to the position of the overlapping region.

Another objective of the present invention is to provide an LCD device which comprises:
a backlight module; and
an LCD panel comprising:
a first substrate; and
a second substrate, disposed opposite to the first substrate, including a plurality of black matrices;
wherein the first substrate comprises:
a base substrate;
a first metal layer disposed on the base substrate, including a gate, a scan line, and a common electrode;
a first insulating layer, of which a portion is disposed on the first metal layer for isolating the first metal layer and an active layer;
the active layer, of which a portion is disposed on the first insulating layer for forming channel;
a second metal layer disposed on the active layer, including a source, a drain electrode, and a data line;
a second insulating layer disposed on the second metal layer, for isolating the second metal layer and a color barrier layer;
the color barrier layer disposed on the second insulating layer, including a plurality of color resist film, wherein a through-hole is formed in the color barrier layer;
a first transparent conductive layer, of which a portion is disposed on the color barrier layer, the first transparent conductive layer being connected with the second metal layer by passing through the through-hole;
a planarization layer disposed on the first transparent conductive layer; and
a second transparent conductive layer disposed on the planarization layer, and electrically connected to the first transparent conductive layer;
wherein black matrices are arranged on the positions corresponding to the scanning line and the channel.

In the LCD device of the present invention, the second transparent conductive layer includes a first conductive portion and a second conductive portion, the first conductive portion corresponds to the position of the scanning line, and a voltage of the first conductive portion is equal to a preset voltage.

In the LCD device of the present invention, the black matrices are arranged only on the positions corresponding to the channel.

In the LCD device of the present invention, the LCD panel has a display area, and the first conductive portion is electrically connected to the first common electrode by passing through a through-hole disposed outside of the display area.

In the LCD device of the present invention, an overlapping region is generated between two adjacent color resist films, and the position of the scanning line corresponds to the position of the overlapping region.

In the LCD device of the present invention, an overlapping region is generated between two adjacent color resist films, and the position of the data line also corresponds to the position of the overlapping region.

The LCD panel and the LCD device of the present invention omit the black matrices arranged on the position corresponding to the data line by means of first disposing a planarization layer on a transparent conductive layer, disposed on the side of a conventional COA substrate, then disposing a transparent conductive layer on the planarization layer, allowing the two transparent conductive layers to be connected, and allowing the uppermost transparent conductive layer to cover most of the overlapping region. Therefore, the LCD panel and the LCD device of the present invention merely use the data lines to shield the overlapping region and increase the aperture ratio more than the prior art.

DESCRIPTION OF SPECIFIC EMBODIMENTS OF THE INVENTION

The preferred embodiments of the present invention will be detailed in the following in combination with the accompanying drawings. Spatially relative terms herein mentioned, such as "above", "beneath", "front", "back", "left", "right", "inner", "outer", "lateral", and the like may be used to describe one element's relationship to another element(s) as illustrated in the figures. Furthermore, the articles "a" and "an" as used in this specification and the appended claims should generally be construed to mean "one or multiple", unless specified or clear from context to be directed to be a singular form. The drawings are drawn schematically and the same reference numbers are used to indicate the same or similar components throughout the drawings.

Figure 2:
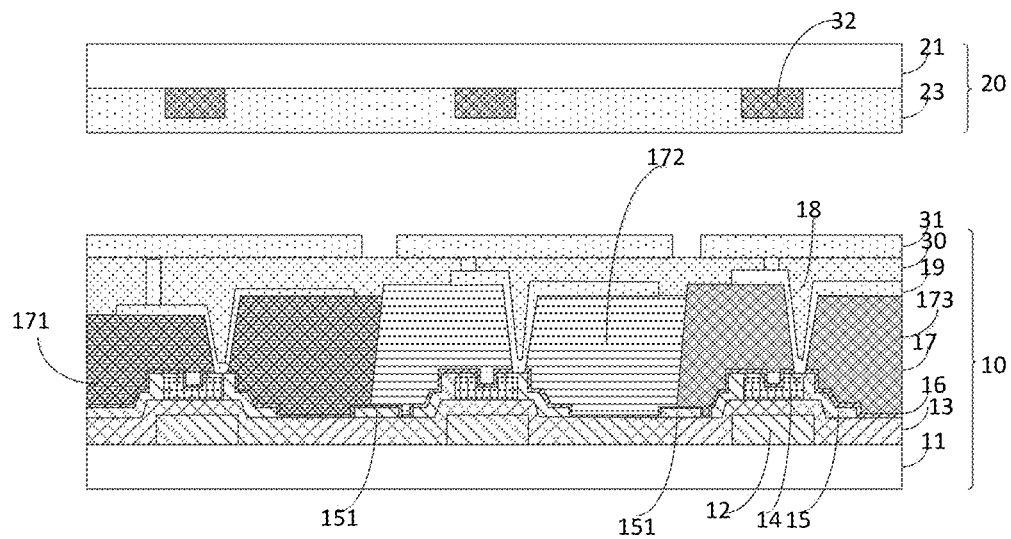
FIG. 2 is a schematic view of an LCD panel according to a first embodiment of the present invention.

Refer to FIG. 2, which is a schematic view of an LCD panel according to a first embodiment of the present invention.

The LCD panel of the present invention comprises: a first substrate 10, a second substrate 20, a liquid crystal layer 10 located between the first substrate and the second substrate 20; the second substrate 20 includes a base substrate 21, a plurality of black matrices 32, and a second common electrode 23. The second common electrode 23 is disposed on the black matrices 32. The first substrate 10, e.g. COA substrate, comprises: a base substrate 11, a first metal layer 12, a first insulating layer 13, an active layer 14, a second metal layer 15, a second insulating layer 16, a color barrier layer 17, a first transparent conductive layer 19, a planarization layer 30, and a second transparent conductive layer 31.

The first metal layer 12 disposed on the base substrate 11 includes a gate electrode, a scanning line, and a first common electrode. A portion of the first insulating layer 13 is disposed on the first metal layer 12 for isolating the first metal layer 12 and the active layer 14. A portion of the active layer 14 is disposed on the first insulating layer 13 for forming channel. The second metal layer 15 disposed on the active layer 14 includes a source, a drain electrode, and the data line 151. The second insulating layer 16 is disposed on the second metal layer 15 for isolating the second metal layer 15 and the color barrier layer 17. The color barrier layer 17 disposed on the second insulating layer 16 includes a plurality of color resist films (such as a red color film 171, a green color film 172, a blue color film 173), and there is a through-hole 18 formed in the color barrier layer 17. A portion of the first transparent conductive layer 19 is disposed on the color barrier layer 17, and the first transparent conductive layer 19 is connected with the second metal layer 15 by passing through the through-hole 18. The second transparent conductive layer 31 is disposed on the planarization layer 30, and it is electrically connected with the first transparent conductive layer 19. The second transparent conductive layer 31 covers most of the overlapping region, and only a small portion of the overlapping region is left so that light can be shielded by the data line 151. No additional black matrices are arranged on the overlapping region above the data line, and therefore the problem of a non-uniform electric field generated around the overlapping region is eliminated.

Thus, black matrices 32 are arranged on positions respectively corresponding to the scanning line and the channel. In the prior art, the black matrices are arranged on positions respectively corresponding to the data line, the scanning line, and the channel. The present invention removes the black matrices arranged on the positions corresponding to the data line, so the black matrices according to the present invention are arranged on the positions corresponding to the scanning line and the channel.

Figure 1:
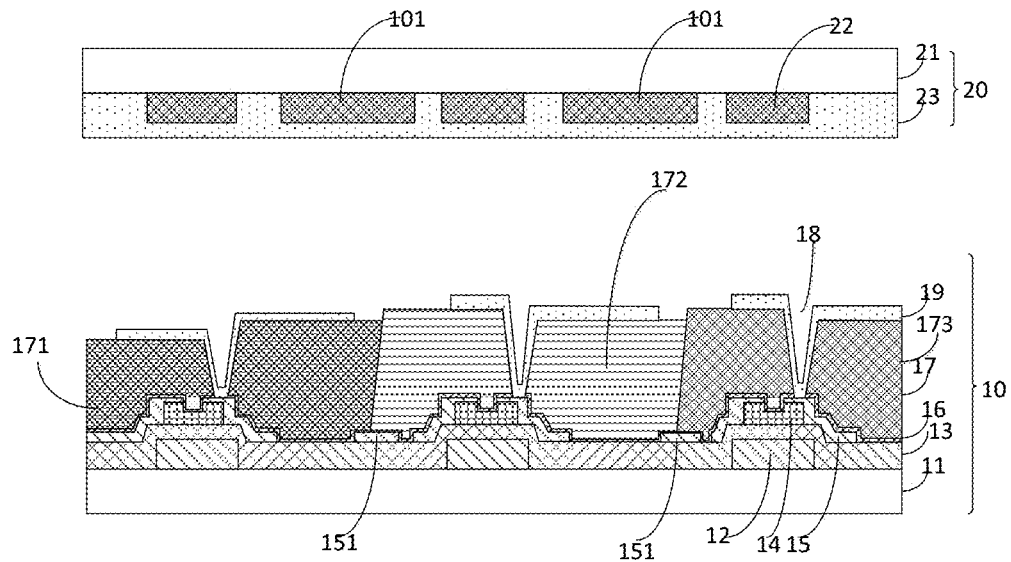
FIG. 1 is a schematic view of an LCD panel of the prior art.

In the prior art, because the overlapping region between two adjacent color resist films is generated, the electric field around the overlapping region is non-uniform. As a result, liquid crystal molecules deflect irregularly and thereby light leakage occurs. Due to the overlapping region being relatively large and cannot be completely shielded by the data line alone, it is necessary to dispose black matrices on a position corresponding to the data line on the second substrate. The present invention provides a planarization layer disposed on the color barrier layer, to planarize the surface of the color barrier layer, and then make the planarization layer be overlain a transparent conductive layer. The transparent conductive layer that is an uppermost layer may cover most of the overlapping region and only leave a small portion of the overlapping region, on which the light can be shielded by the data line. It is not necessary that extra black matrices be arranged on the overlapping region above the data line, and therefore the problem of a non-uniform electric field being produced by the overlapping of color resist films is eliminated. By omitting the black matrices arranged on the position corresponding to the data line, the black matrices according to the present invention are arranged on the positions respectively corresponding to the scanning line and the channel, in conjunction with FIG. 1; that is, a black matrix 101 omitted as shown in FIG. 1. Due to some of the black matrices being omitted, the aperture ratio is increased.

Preferably, a position of an overlapping region generated between two adjacent color resist films, for example, an overlapping region formed between the red color film 171 and the green color film 172, corresponds to the position of the scanning line 121. Due to a non-uniform electric field being generated by the overlapping region, a light shielding arrangement is required around the overlapping region. Since the scanning line itself possess the functionality of light shielding, a design which avoid arranging the scanning line on a position outside the overlapping region would reduce aperture ratio of the panel. Therefore, such a design can improve the aperture ratio of the panel. Of course, the aperture ratio of the panel can further improve if the position of the data line also corresponds to the position of the overlapping region.

Figure 3:
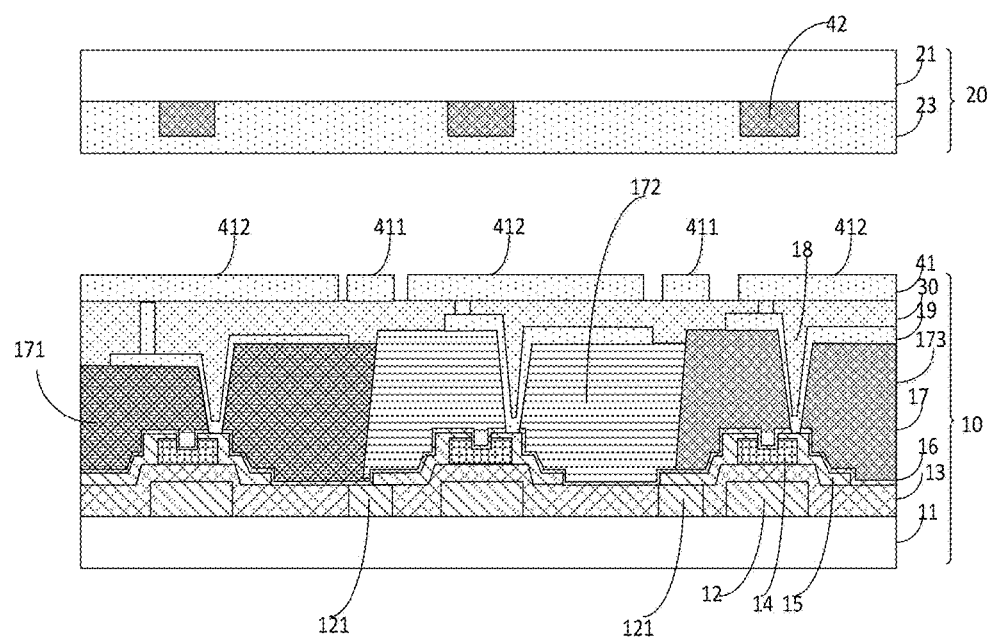
FIG. 3 is a schematic view of an LCD panel according to a second embodiment of the present invention.

Refer to FIG. 3, which is a schematic view of an LCD panel according to a second embodiment of the present invention.

In conjunction with FIG. 3, the difference between the embodiment and the preceding embodiment is that:

The second transparent conductive layer 41 includes a first conductive portion 411 and the second conductive portion 412, wherein the first conductive portion 411 corresponds to the position of the scanning line 121 and a voltage of the first conductive portion 411 is equal to a preset voltage. The first conductive portion 411 and the second conductive portion 412 are separated, and the preset voltage is, for example, the voltage of the first common electrode. Since the voltage of the first common electrode is equal to the voltage of the second common electrode, it can avoid voltage fluctuations on the scanning line 121 influencing a voltage difference between the upper and lower substrates by means of rendering the voltage of the first conductive portion 411 equal to the voltage of the first common electrode. Accordingly, the black matrices arranged on the position corresponding to the data line are omitted, and the aperture ratio is further increased.

Preferably, the LCD panel has a display area, and the first conductive portion 411 is electrically connected to the first common electrode by passing through a through hole which is disposed outside of the display area. This can avoid causing interference to circuits within the display area of panel by disposing the connection point of the first conductive portion 411 and the first common electrode outside the display area. As such, the performance of liquid crystal display can be improved.

Figure 4:
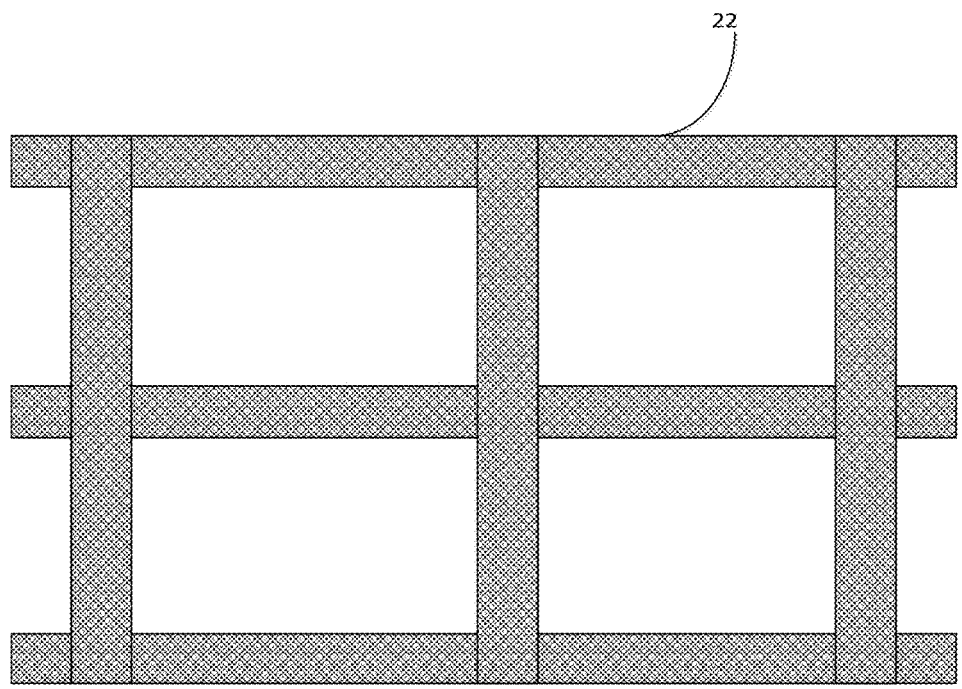
FIG. 4 is a top view of a black matrix of the prior art.
Figure 5:
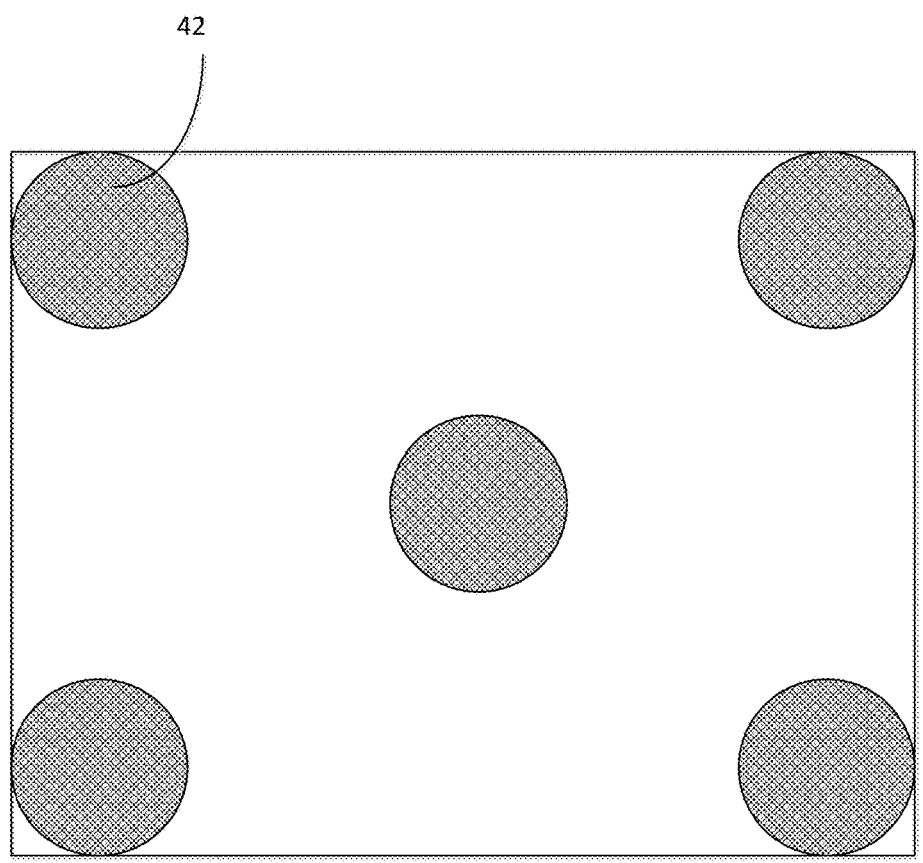
FIG. 5 is a top view of a black matrix of the present invention.

Preferably, the black matrices 42 are arranged only on the position corresponding to the channel, namely, the position of the black matrices 42 corresponds to the position of the channel. FIG. 4 shows a top view of a black matrix of the prior art, in which the black matrices 22 in the horizontal direction correspond to the position of the scanning line and the black matrices 22 in the vertical direction corresponds to the position of the data line. After the improvement of the present invention, a top view of a black matrix of the present invention is as shown in FIG. 5, and the black matrices 42 of the present invention merely correspond to the channel. Consequently, the aperture ratio is further increased.

The present invention also provides an LCD device, which includes a backlight module and an LCD panel. In conjunction with FIG. 2, the LCD panel comprises:

a first substrate 10; and a second substrate 20, disposed opposite to the first substrate 10, including a plurality of black matrices 32;

wherein the first substrate 10 includes:

a base substrate 11;

a first metal layer 12 disposed on the base substrate 11, including a gate, a first scan line, and a common electrode;

a first insulating layer 13, of which a portion is disposed on the first metal layer 12 for isolating the first metal layer 12 and the active layer 14;

an active layer 14, of which a portion is disposed on the first insulating layer 13 for forming channel;

a second metal layer 15 disposed on the active layer 14, including a source, a drain electrode, and a data line 151;

a second insulating layer 16 disposed on the second metal layer 15, for isolating the second metal layer 15 and a color barrier layer 17;

the color barrier layer 17 disposed on the second insulating layer 16, including a plurality of color resist film, wherein a through-hole 18 is formed in the color barrier layer;

a first transparent conductive layer 19, of which a portion is disposed on the color barrier layer 17, the first transparent conductive layer 19 being connected with the second metal layer 15 by passing through the through-hole 18;

a planarization layer 30 disposed on the first transparent conductive layer 19; and a second transparent conductive layer 31 disposed on the planarization layer 30, and electrically connected to the first transparent conductive layer 19;

wherein the black matrices 32 are arranged on the positions corresponding to the scanning line and the channel.

Preferably, in conjunction with FIG. 3, the second transparent conductive layer 41 includes the first conductive portion 411 and the second conductive portion 412. The first conductive portion 411 corresponds to the position of the scanning line 121, and a voltage of the first conductive portion 411 is equal to a preset voltage.

Preferably, in conjunction with FIG. 3, the black matrices 42 are arranged only on the position corresponding to the channel.

Preferably, in conjunction with FIG. 3, the LCD panel has a display area, and the first conductive portion 411 is electrically connected to the first common electrode by passing through a through-hole disposed outside of the display area.

Preferably, an overlapping region is generated between two adjacent color resist films, and the position of the scanning line 121 corresponds to the position of the overlapping region. The LCD device of the present invention may comprise any of the LCD panels described above.

The LCD panel and the LCD device of the present invention omit the black matrices arranged on the position corresponding to the data line and augment the aperture ratio by means of first disposing a planarization layer on a transparent conductive layer, disposed on the side of a conventional COA substrate, then disposing a transparent conductive layer on the planarization layer, allowing the two transparent conductive layers to be connected, and allowing the uppermost transparent conductive layer to cover most of the overlapping region.

In summary, while the present invention has been described preferred embodiments, it is understood that the above-described preferred embodiments are not intended to limit the present invention. One of ordinary skill in the art, without departure from the spirit and scope of the invention, can make various kinds of modifications and variations, and the scope of the present invention is to be defined by the claims.

What is claimed is:

1. An LCD panel comprising:

a first substrate; and a second substrate, disposed opposite to the first substrate, including a plurality of black matrices;

wherein the first substrate comprises:

a base substrate;

a first metal layer disposed on the base substrate, including a gate, a scan line, and a first common electrode;

a first insulating layer, of which a portion is disposed on the first metal layer for isolating the first metal layer and an active layer;

the active layer, of which a portion is disposed on the first insulating layer for forming channel;

a second metal layer disposed on the active layer, including a source, a drain, and a data line;

a second insulating layer disposed on the second metal layer, for isolating the second metal layer and a color barrier layer;

the color barrier layer disposed on the second insulating layer, including a plurality of color resist films, wherein a through-hole is formed in the color barrier layer;

a first transparent conductive layer, of which a portion is disposed on the color barrier layer, the first transparent conductive layer being connected with the second metal layer by the through-hole;

a planarization layer disposed on the first transparent conductive layer; and a second transparent conductive layer disposed on the planarization layer, and electrically connected to the first transparent conductive layer;

wherein the second transparent conductive layer includes a first conductive portion and a second conductive portion, the first conductive portion corresponds to a position of the scanning line, and a voltage of the first conductive portion is equal to a preset voltage, the black matrices are arranged only on positions corresponding to the channel, an overlapping region is generated between two adjacent color resist films, and the position of the scanning line corresponds to a position of the overlapping region; and wherein no black matrices are arranged on a position corresponding to the data line.

2. The LCD panel according to claim 1, wherein the LCD panel has a display area, and the first conductive portion is electrically connected to the first common electrode by a through-hole disposed outside of the display area.

3. The LCD panel according to claim 1, wherein the position of the data line also corresponds to the position of the overlapping region.

4. An LCD panel comprising:
a first substrate; and
a second substrate, disposed opposite to the first substrate, including a plurality of black matrices;
wherein the first substrate comprises:
a base substrate;
a first metal layer disposed on the base substrate, including a gate, a scan line, and a first common electrode;
a first insulating layer, of which a portion is disposed on the first metal layer for isolating the first metal layer and an active layer;
the active layer, of which a portion is disposed on the first insulating layer for forming channel;
a second metal layer disposed on the active layer, including a source, a drain and a data line;
a second insulating layer disposed on the second metal layer, for isolating the second metal layer and a color barrier layer;
the color barrier layer disposed on the second insulating layer, including a plurality of color resist films, wherein a through-hole is formed in the color barrier layer;
a first transparent conductive layer, of which a portion is disposed on the color barrier layer, the first transparent conductive layer being connected with the second metal layer by the through-hole;
a planarization layer disposed on the first transparent conductive layer; and
a second transparent conductive layer disposed on the planarization layer, and electrically connected to the first transparent conductive layer;
wherein black matrices are arranged on the positions corresponding to the scanning lines and the channel; and
an overlapping region is between two adjacent color resist films and a position of the scanning line corresponds to a position of the overlapping region, and no black matrices are arranged on an overlapping region above the data line.

5. The LCD panel according to claim 4, wherein the second transparent conductive layer includes a first conductive portion and a second conductive portion, the first conductive portion corresponds to a position of the scanning line, and a voltage of the first conductive portion is equal to a preset voltage.

6. The LCD panel according to claim 5, wherein the black matrices are arranged only on the positions corresponding to the channel.

7. The LCD panel according to claim 5, wherein the LCD panel has a display area, and the first conductive portion is electrically connected to the first common electrode by a through-hole disposed outside of the display area.

8. The LCD panel according to claim 4, wherein the position of the data line also corresponds to the position of the overlapping region.

9. An LCD device comprising:
a backlight module; and
an LCD panel comprises:
a first substrate; and
a second substrate, disposed opposite to the first substrate, including a plurality of black matrices;
wherein the first substrate comprises:
a base substrate;
a first metal layer disposed on the base substrate, including a gate, a scan line and a first common electrode;
a first insulating layer, of which a portion is disposed on the first metal layer for isolating the first metal layer and an active layer;
the active layer, of which a portion is disposed on the first insulating layer for forming channel;
a second metal layer disposed on the active layer, including a source, a drain and a data line;
a second insulating layer disposed on the second metal layer, for isolating the second metal layer and a color barrier layer;
the color barrier layer disposed on the second insulating layer, including a plurality of color resist films, wherein a through-hole is formed in the color barrier layer;
a first transparent conductive layer, of which a portion is disposed on the color barrier layer, the first transparent conductive layer being connected with the second metal layer by passing through the through-hole;
a planarization layer disposed on the first transparent conductive layer; and
a second transparent conductive layer disposed on the planarization layer, and electrically connected to the first transparent conductive layer;
wherein black matrices are arranged on the positions corresponding to the scanning lines and the channel;
an overlapping region is between two adjacent color resist films and a position of the scanning line corresponds to a position of the overlapping region, and no black matrices are arranged on an overlapping region above the data line.

10. The LCD device according to claim 9, wherein the second transparent conductive layer includes the first conductive portion and the second conductive portion, the first conductive portion corresponds to the position of the scanning line, and a voltage of the first conductive portion is equal to a preset voltage.

11. The LCD device according to claim 10, wherein the black matrices are arranged only on the positions corresponding to the channel.

12. The LCD device according to claim 10, wherein the LCD panel has a display area, and the first conductive portion is electrically connected to the first common electrode by a through-hole disposed outside of the display area.

13. The LCD device according to claim 9, wherein the position of the data line also corresponds to a position of the overlapping region.

* * * * *